April 16, 1929.   F. W. HILD   1,709,790
CONTROL DEVICE
Filed Nov. 21, 1925   2 Sheets-Sheet 1

WITNESSES:

INVENTOR
Frederic W. Hild.
BY
ATTORNEY

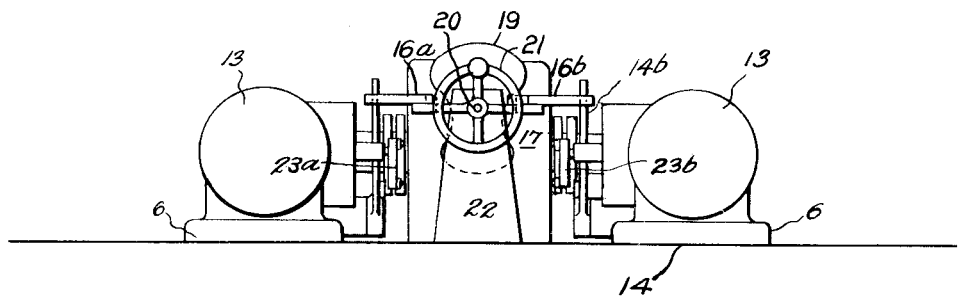
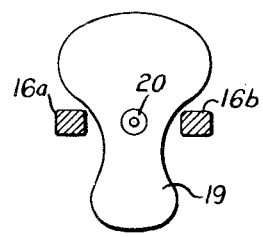
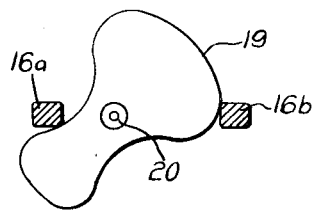
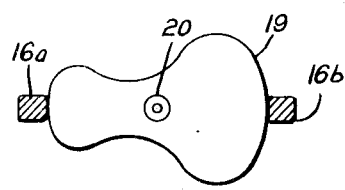
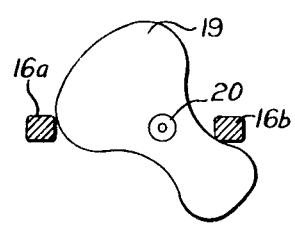
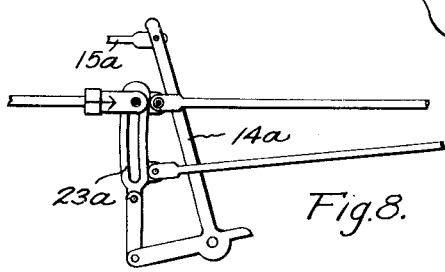

Patented Apr. 16, 1929.

1,709,790

UNITED STATES PATENT OFFICE.

FREDERIC W. HILD, OF LOS ANGELES, CALIFORNIA.

CONTROL DEVICE.

Application filed November 21, 1925. Serial No. 70,685.

My invention relates to control devices for drive mechanisms, more particularly to power-transmitting devices wherein a plurality of reciprocating engines are utilized as prime movers.

It is among the objects of my invention to provide a control mechanism for a plurality of reciprocating engines which shall be manually operative to govern the direction of rotation of the engine members.

Another object of my invention is to provide a common control means for a plurality of reciprocating engines, which means shall be adapted to so control one or both of the engines that the engines will operate in the same direction of rotation simultaneously or in opposite directions, as the case may be.

Another object of my invention is to provide a manual control mechanism for a plurality of reciprocating engines which shall be of simple and durable mechanical construction and adapted to be utilized as an accessory for standard engine units.

There are some applications of reciprocating engines wherein it is necessary or desirable to utilize a pair of engines to supply the motive power to a common driven element, one of which is the adaptation of reciprocating engines to rotary earth-boring machinery.

In my copending application, Serial No. 67,017, filed Nov. 5, 1925, I have described a transmission mechanism embodying a differential transmission device that is designed to be operated by a plurality of reciprocating engines. The engine members are coupled independently to the differential gear mechanism, so that the operating characteristics of the latter are dependent upon the direction of rotation of the several engine members.

In this particular adaptation of reciprocating engines operating through a differential gear transmission device, it becomes desirable to regulate the engines at times independently and at times simultaneously, so as to produce a desirable operating characteristic for the driven element of the gear transmission mechanism.

My present invention is designed to provide a control device which is associated with a pair of engine members in such manner and which possesses such operating characteristics as to permit the regulation of the engines independently or simultaneously, as desired.

Figure 1:
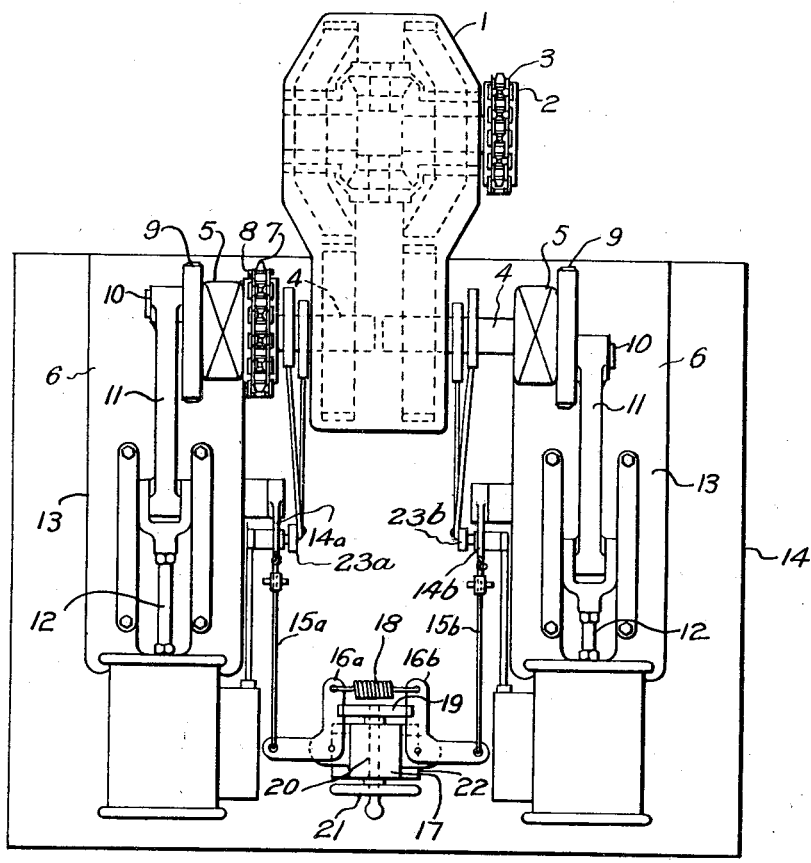
Figure 1:
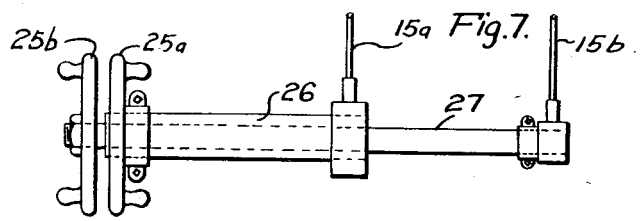

In the accompanying drawings constituting a part hereof and in which like reference characters designate like parts, Fig. 1 is a diagrammatic view of a pair of reciprocating engines embodying the principles of my invention to adapt them to a differential gear transmission mechanism in a manner in which they may be utilized for earth-boring operations;

Fig. 2 is a view in end elevation of a pair of engine members associated with the regulating or control device constituting the present invention;

Figures 3 to 6, inclusive, are diagrammatic views showing the relative positions of the regulating mechanism for the different operating characteristics it is desired to obtain in the engine members, and Fig. 7 illustrates a modified form of hand control mechanism.

Fig. 8 is a fragmentary view of a conventional valve gear.

Referring to Fig. 1 of the drawings, the structure therein illustrated comprises a gear case 1 embodying a differential gear transmission mechanism, which is described in detail in the aforementioned copending application having a driving sprocket-wheel 2 associated therewith that is operatively connected by a chain 3 to the work that is acted upon. In the gear housing 1 is journalled a pair of coaxially alined shafts 4 that are supported at their extended ends in journal bearings 5 of a pair of engine base members 6. One of the shafts 4 is provided with a sprocket-wheel 7 having a chain 8 engaged therewith for connecting a driven element, the arrangement being similar to the wheel and chain 2 and 3. The ends of the shafts 4 are respectively provided with crank disks 9 having cranks 10 and connecting rods 11, the latter being connected to the piston members 12 of reciprocating engines 13 that are preferably mounted on a common base 14.

The engine members 13 are provided with the usual reversing linkages 23$^a$ and 23$^b$ and these are actuated by the regulating or control levers 14$^a$ and 14$^b$, which are associated through a pair of connecting rods 15$^a$ and 15$^b$ and bell cranks 16ᵃ and 16ᵇ to a common regulating device 17. The bell cranks 16ᵃ and 16ᵇ are biased by an intermediate spring 18 to maintain the position shown in Fig. 1, except as they are acted upon by a cam member 19, enlargements of which are shown in Figs. 3 to 6, inclusive.

The cam 19 is secured to a shaft 20 having a hand-wheel 21 provided at one end thereof. The shaft 20 is journalled in a pedestal block 22, Figs. 1 and 2, so that when the hand-wheel 21 is rotated, the cam member 19 is rotated to engage the bell cranks 16ᵃ and 16ᵇ.

The operation of my device is briefly as follows: The normal position of the bell cranks 16ᵃ and 16ᵇ corresponds to the normal position of the control levers 14ᵃ and 14ᵇ, as shown in Fig. 3. In this position the cam member 19 does not touch either of the cranks, and both engines are rotating in the same "forward" direction. In Fig. 4, the bell crank 16ᵃ retains the position shown in Fig. 3, which maintains the engine to which it is connected in a forward rotative direction, while the bell crank 16ᵇ to the right of the cam is moved and actuates the levers 15ᵇ and 14ᵇ, thereby operating the reversing linkage 23ᵇ to reverse the direction of rotation of the right hand engine member.

With the position of the cam 19 as shown in Fig. 5, the bell cranks are separated against the tension of the spring 18, and in this position both of the engines are in reverse. With the cam in the position shown in Fig. 6, the bell crank 16ᵇ to the right of the cam takes the position it has in Fig. 3, which maintains the forward direction of rotation of the corresponding engine, and the bell crank 16ᵃ to the left of the cam takes the position in which the corresponding engine is in reverse.

As shown in Fig. 7, the same manner of controlling the levers 14ᵃ and 14ᵇ may be exercised by the employment of a pair of manual control members 25ᵃ and 25ᵇ, the former being associated through a hollow shaft 26 with the lever 15ᵃ of the left-hand engine 13 of Fig. 1. The member 25ᵇ is associated with a shaft 27 which extends through hollow shaft 26 and is connected to the lever 15ᵇ. In operation, the wheels may be actuated simultaneously for rotation in the same direction or severally for controlling each engine member.

From this description it will be seen that there are four positions of the cam member 19, in which the engines are respectively operated simultaneously in the forward direction, as shown in Fig. 3; one of them in forward and the other in reverse, as shown in Fig. 4; both in reverse, as shown in Fig 5; and one in reverse and the other in forward, as shown in Fig. 6. With this arrangement, it is a simple matter to regulate the engines from a common control member that is actuated by a hand wheel.

It is evident from the foregoing description of my invention that a control device for reciprocating engines as described therein provides a simple and efficient means for controlling a plurality of engine units that are connected to a common driven member, to obtain the desired direction of rotation consistent with the characteristics developed by the work operated on.

Although I have described a specific embodiment of my invention, it will be obvious to those skilled in the art that various modifications may be made in the details of construction and in the arrangement of the several cooperating parts without departing from the principles herein set forth.

I claim as my invention:

1. The combination with a pair of reciprocating engines, of means for controlling the direction of rotation of the engines comprising a pair of levers and a manually operative actuating device, means for connecting said levers and said actuating device, and a cam associated with said actuating device for operating either or both of said levers.

2. The combination with a pair of reciprocating engines, of means comprising levers for controlling the direction of rotation of the engines, a manually operative actuating device, bell-cranks associated with said device, means for connecting said bell-cranks and the control levers of said engines, and a cam member associated with said actuating device for operating either or both of said bell-cranks.

3. The combination with a pair of reciprocating engines, of means for controlling said engines comprising a plurality of control levers, a manually operative actuating device for said levers, bell-crank levers associated with said actuating device, means for connecting said bell-crank levers and the control levers of said engines, and a cam member associated with said actuating device for operating either or both of said crank levers, said control means being effective to regulate the direction of rotation of said engines.

4. The combination with a pair of reciprocating engines, of means comprising levers for controlling the engines, a manually operative actuating device, bell-crank levers associated therewith, means for connecting said bell crank levers and the control levers of said engines, and a cam member associated with said actuating device for operating either or both of said first named levers, said control means being effective to regulate the rotation of said engines so that they will operate in the same or opposite directions of rotation.

5. The combination with a pair of driven members, of a pair of reciprocating engines therefor, a differential mechanism connecting said driven members, and regulating means for said engines, said regulating means comprising a cam member disposed to control the direction of operation of each of the engines.

6. The combination with a plurality of reciprocating engines having reverse gears, of a cam member operatively connected to the reverse gears of the engines, said cam member being disposed to selectively operate said reverse gears.

7. In a power-transmission system, in combination, two reciprocating engines having reversing linkages, a cam member, and means for operatively connecting the cam member to the reversing linkages whereby the cam member is disposed to selectively control the direction of operation of each of the engines.

8. The combination with a pair of reciprocating engines having reversing mechanism, of a cam member operatively connected to the reversing mechanism, said cam member being disposed to control the engines in such manner that either engine may be operated in either direction independently of the other engine.

In testimony whereof, I have hereunto subscribed my name this 9th day of November, 1925.

FREDERIC W. HILD.